United States Patent [19]

Brendley, Jr.

[11] 4,131,572
[45] Dec. 26, 1978

[54] POWDER COATINGS CONTAINING COPOLYMER CONTAINING ISOBORNYL METHACRYLATE AS MELT FLOW MODIFIER

[75] Inventor: William H. Brendley, Jr., Hatboro, Pa.

[73] Assignee: Rohm and Haas Company, Philadelphia, Pa.

[21] Appl. No.: 578,441

[22] Filed: May 16, 1975

Related U.S. Application Data

[62] Division of Ser. No. 108,996, Jan. 22, 1971, abandoned.

[51] Int. Cl.$^2$ ................................................. C08L 1/10
[52] U.S. Cl. ........................... 260/17 R; 260/17 A; 260/884; 260/890; 260/901; 427/185; 427/195; 428/426; 428/457; 428/537
[58] Field of Search ............... 526/282, 325, 258, 280, 526/281; 427/185, 195; 260/17 A, 17 R, 884, 890, 901

[56] References Cited

U.S. PATENT DOCUMENTS

| 3,186,860 | 6/1965 | Jones | 117/DIG. 6 |
|---|---|---|---|
| 3,267,179 | 8/1966 | Russell et al. | 260/901 |
| 3,485,775 | 12/1969 | Cenci et al. | 526/282 |
| 3,536,788 | 10/1970 | Hurwitz et al. | 526/282 |
| 3,549,403 | 12/1970 | Williams, Jr. et al. | 427/32 |
| 3,651,014 | 3/1972 | Witsiepe | 260/75 R |
| 3,681,298 | 8/1972 | Hurwitz et al. | 526/258 |

OTHER PUBLICATIONS

Powder Coating: Why-How-When, SMARSH, *Journ. of Paint Technology*.

*Primary Examiner*—Edward M. Woodberry

[57] ABSTRACT

Low molecular weight copolymers of (1) acrylic acid esters or methacrylic acid esters of alcohols such as methanol with (2) esters of bicyclic alcohols such as isobornyl alcohol and unsaturated acids such as methacrylic acid, as contrasted with high molecular weight copolymers of such monomers (1) and (2) (see U.S. patent No. 3,485,775) and as contrasted to other acrylic polymers, are found to be exceptional in compatibility with practically all types of hard coating resins, and to lower the flow temperature of the mixture when using powder coating methods such as an electrostatic spray or a fluidized bed, electrostatic or not, as compared with the use of the hard coating resin alone.

12 Claims, No Drawings

POWDER COATINGS CONTAINING COPOLYMER CONTAINING ISOBORNYL METHACRYLATE AS MELT FLOW MODIFIER

This application is a division of application Ser. No. 108,996 filed Jan. 22, 1971, now abandoned, and is related to Ser. No. 60,604 filed Aug. 3, 1970, abandoned in favor of continuation application Ser. No. 468,944 filed May 8, 1974, now patent No. 3,940,353, and to Ser. No. 60,654 filed Aug. 3, 1970, now patent No. 3,681,298.

SPECIFICATION

This invention relates to the use of copolymers of unsaturated esters of bicyclic alcohols and unsaturated acids as melt flow temperature reducing polymers in powder coatings, using the hard coating resins in common use. In a specific embodiment, modifying polymers are provided which have large proportions of copolymerized isobornyl methacrylate and methyl methacrylate, optionally with minor amounts of polar monomers to improve adhesion of coatings containing the same to various substrates, and/or to provide crosslinking sites, and which commonly improve the ability of the polymer solutions to "wet" pigments and pigment-like dyes.

Conventional systems for coating substrates such as metals, glass, wood, etc. comprise utilizing the polymers dissolved or dispersed in liquids. The processes involving liquids have a number of disadvantages including air pollution by solvent vapors, the added cost of using the solvent as a carrier for the polymer, the ventilation and fire hazard problems, toxicity, viscosity problems requiring the use of a low solids content and the necessity to use repeated coatings to obtain a given film thickness, and so forth. Many polymers with desirable coating properties have not been successfully applied from solvent systems because of incompatibility, or insolubility, examples being the nylons, polyolefins, chlorinated polyethers, and fluorocarbons.

Powder coating avoids such problems, and may be defined as any process which will deposit an essentially solventless powder which is capable of being fused or cured into a coherent, protective, and durable coating, upon any substrate, particularly conductive substrates. The powder coatings, particularly those applied to substrates which have a difference in electrostatic charge from the powder, have the advantage of providing excellent uniformity of coatings, even over edges and corners, with no sagging, orange peel, or drip marks present. The principal commercial powder coating methods are the fluidized bed coating method, the electrostatically charged fluidized bed, and the electrostatic spray or cloud methods. Fluidized bed coating is based upon dipping a preheated object into a bed of finely divided dry coating materials, often with a postheating step to provide a smooth coating. Coatings of 5 to 50 mils can readily be obtained in this method. The electrostatic fluidized bed, spray, or cloud method normally involves providing a charge upon the particles, although the object to be coated can also be charged, followed by exposing the substrate, commonly grounded, to the mist, spray, or cloud of powdered coating resins. Usually the particles are supplied with a negative charge, although some materials such as the nylons are most useful with a positive charge. With resins which retain the charge for a long period of time, it is possible to obtain a very thin layer or coating because the layer of powder on the metal retains the charge and tends to repel additional powder particles. Uniform coatings of as low as about 2 mils are possible utilizing this method and up to 10 to 20 mils or more is also possible. Examples of polymers which retain their charge which is bled off slowly are the epoxies, the cellulosics, and the nylons. Others lose their charge quite rapidly, the vinyl resins being an example, permitting rapid build-up of heavy layers of powder. Such powders may make it advisable to utilize a preheated object to obtain the necessary fusion of the powdered composition.

Some of the problems involved with powder coatings is that in order to achieve the necessary flow of the polymers, temperatures high enough to char the polymer, prematurely crosslink in the case of thermosetting resins, discolor the polymer, and cause other damage to the polymer are commonly necessary. While external plasticizers are a partial solution to these problems, many plasticizers are not useful for powder coatings in that they tend to cause the particles to stick together or they may exude or be extracted from the coating on the finished article.

Acrylic polymers have long been used as modifiers for various other polymers, including alkyds and oil-modified alkyds, cellulose esters, such as nitrocellulose and cellulose acetate butyrate, other acrylic polymers, and other vinyl polymers such as polyvinyl chloride polymers. However, in the past, acrylic polymers were limited as to compatibility in that only certain classes of resins or polymers could be modified with a given acrylic polymer. A universally compatible acrylic modifier which also has the other necessary and desirable properties has long been sought.

It has now been found that a copolymer of 40 percent to 60 percent by weight of a compound of the formula

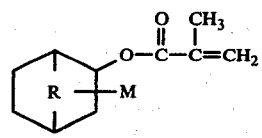

where R is selected from the group consisting of —CH$_2$—, —CH(CH$_3$)—, and —C(CH$_3$)$_2$—, and M is selected from the group consisting of a hydrogen atom and at least one methyl group, and 40 percent to 60 percent of styrene, vinyl toluene, or, preferably, at least one ester of acrylic acid or methacrylic acid, and having an average molecular weight of 1,000 to 8,500, preferably 2,000 to 3,000, are compatible with essentially all types of coating resins known to be useful in powder coating methods, and results in proper flow of the coating resin when heated. Suitable ratios of (A) the copolymer of the bicyclic alcohol ester of methacrylic acid with styrene, vinyl toluene, or an ester of acrylic or methacrylic acid with an alcohol, and (B) the coating resin, are such that the weight ratio of (A) to (B) is between 3:97 and 10:90, preferably from 4:95 to 7:93. Optionally, from 0.05 percent up to 5 percent, preferably 0.1 percent to 3 percent, by weight of one or more of an α,β-ethylenically unsaturated carboxylic acid or monomers of the formulas II, III, IV, or V, given below, or combinations thereof, based on total monomer weight, are included as comonomers. Such materials provide the function of improving adhesion of the acrylic polymers and other polymers modified there-with (U.S. Pat. Nos. 3,037,955 and 3,061,564) and for improving pigment or pigment-like dye dispersibility in the subject coating resins, also providing crosslinking sites if the coating resin is thermosetting.

The acrylic acid and methacrylic acid ester monomers include methyl acrylate, ethyl acrylate, propyl acrylate, isopropyl acrylate, butyl acrylate, isobutyl acrylate, sec-butyl acrylate, amyl acrylate, isoamyl acrylate, hexyl acrylate, 2-ethylhexyl acrylate, octyl acrylate, 3,5,5-trimethylhexyl acrylate, decyl acrylate, dodecyl acrylate, cetyl acrylate, octadecyl acrylate, octadecenyl acrylate, n-amyl methacrylate, sec-amyl methacrylate, hexyl methacrylate, 2-ethylbutyl methacrylate, octyl methacrylate, 3,5,5-trimethylhexyl methacrylate, decyl methacrylate, dodecyl methacrylate, octadecyl methacrylate, butoxyethyl acrylate or methacrylate or other alkoxyethyl acrylate or methacrylate, methyl methacrylate, ethyl methacrylate, propyl methacrylate, isopropyl methacrylate, butyl methacrylate, sec-butyl methacrylate, and tert-butyl methacrylate, tert-amyl methacrylate, tert-butyl or tert-amyl acrylate, cyclohexyl acrylate or methacrylate, lauryl acrylate or methacrylate, and phenoxyethyl methacrylate. The alcohol moiety has 1 to 18 carbons.

Preferred are acrylic and methacrylic acid esters the homopolymers of which have a Ti, defined below, of at least 10° C., and preferably at least about 65° C., and up to 100° C. or more. Among the acrylic acid and methacrylic acid esters, methyl methacrylate is especially preferred.

As has been mentioned heretofore, besides the essentially non-functional monomers just recited, there may be included within the melt flow-modifying copolymer up to 50 percent, preferably 0.05 to 5 percent, by weight of various functional, polar, or reactive monomers including the α,β-unsaturated carboxylic acids, half esters and half amides of α,β-unsaturated dicarboxylic acids, and salts thereof with ammonia, an alkali-metal, such as sodium, potassium or lithium, or a volatile water-soluble amine such as dimethylamine or triethylamine. Examples of copolymerizable ethylenically unsaturated monocarboxylic or polycarboxylic acids are sorbic, cinnamic, vinyl furoic, α-chlorosorbic, p-vinylbenzoic, acrylic, methacrylic, maleic, fumaric, aconitic, atropic, crotonic, and itaconic acid, or mixtures thereof, with itaconic acid and the α,β-unsaturated monocarboxylic acids, particularly methacrylic acid and acrylic acid, being preferred. Other copolymerizable acid monomers include the alkyl half esters or partial esters of unsaturated polycarboxylic acids such as of itaconic acid, maleic acid, and fumaric acid, or the partial amides thereof. Preferred half esters are the lower alkyl ($C_1$ to $C_6$) esters such as methyl acid itaconate, butyl acid itaconate, methyl acid fumarate, butyl acid fumarate, methyl acid maleate, and butyl acid maleate. Such partial esters and partial amides are considered to be "α,β-unsaturated monocarboxylic acids," and the term as used herein includes such esters and amides.

In addition to the acids, acrylamide, methacrylamide, 2-sulfoethyl methacrylate, the materials disclosed in U.S. Pat. Nos. 3,446,777 to W. D. Emmons, 3,150,118 to D. H. Clemens, and 3,266,930 to W. D. Emmons and E. Hankins Owens, and various other functional monomers falling within the definitions of formulas II, III, IV, and V, are also useful, as follows:

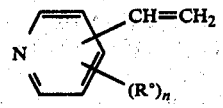

where
R° is selected from the group consisting of H and alkyl groups having 1 to 4 carbon atoms, and
n is an integer having a value of 1 to 4,

where R is selected from the group consisting of H and $CH_3$,
A is selected from the group consisting of O, S,

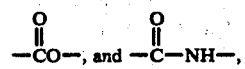

Y is an alkylene group having 2 to 4 carbon atoms,
$R^1$ is selected from the group consisting of H and an alkyl group having 1 to 4 carbon atoms, and
$R^2$ is selected from the group consisting of H and an alkyl group having 1 to 4 carbon atoms,

where R is the same as above, and
Z is an alkylene group having 2 to 3 carbon atoms.

Examples of compounds of formula II include: 2-vinylpyridine; 2-vinylpyridine; 4-vinylpyridine; 2-methyl-5-vinylpyridine; 5-methyl-2-vinylpyridine; 4-methyl-2-vinylpyridine; 2-ethyl-5-vinylpyridine; 2,3,4-trimethyl-5-vinylpyridine; 3,4,5,6-tetramethyl-2-vinylpyridine; 3-ethyl-5-vinylpyridine; 2,6-diethyl-4-vinylpyridine.

Examples of compounds of formula III include: dimethylaminoethyl acrylate and methacrylate; diethylaminoethyl acrylate and methacrylate; dimethylaminopropyl acrylate and methacrylate; diethylaminopropyl acrylate and methacrylate; dipropylaminoethyl acrylate and methacrylate; di-n-butylaminoethyl acrylate and methacrylate; di-sec-butylaminoethyl acrylate and methacrylate; di-t-butylaminoethyl acrylate and methacrylate; dimethylaminoethyl vinyl ether and sulfide; diethylaminoethyl vinyl ether and sulfide; aminoethyl vinyl ether and sulfide; monomethylaminoethyl vinyl ether and sulfide; N,N-dimethylaminoethyl acrylamide and methacrylamide; N,N-diethylaminoethyl acrylamide and methacrylamide.

Examples of compounds of formula IV include:
N-[β-(α-methacryloxyacetamido)ethyl]-N,N'-ethyleneurea;
N-[β-(α-acryloxyacetamido)ethyl]-N,N'-ethyleneurea;
N-[β-(α-acryloxyacetamido)ethyl]-N,N'-trimethyleneurea;
N-[β-(α-methacryloxyacetamido)ethyl]-N,N'-trimethyleneurea.

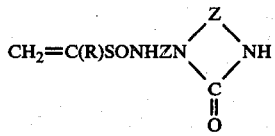

where R and Z are as defined above, of which an example is N-[β-(methacrylamido)ethyl]-N,N'-ethyleneurea.

The copolymer melt flow modifier additives of the invention may be made by a variety of methods. One suitable method is by bulk polymerization of the monomeric ingredients. In accordance with that process a suitable amount of monomers is mixed with an addition polymerization catalyst, such as azobisisobutyronitrile, lauroyl peroxide, acetyl peroxide, t-butyl peracetate, t-butyl hydroperoxide, etc., at a temperature sufficient to cause polymerization such as in the range of 25° to 100° C. or higher. Commonly used molecular weight regulators such as the aliphatic mercaptans, for example, n-dodecyl mercaptan, are also included in the polymerization mixture. High temperature solution polymerization also gives a low molecular weight polymer.

The copolymers also may be prepared by granular, emulsion, non-aqueous dispersion or solution polymerization of the several comonomers and, if desired, a portion having a preferred narrow range of molecular weight may be extracted from the products of such polymerization procedures by preferentail solvent techniques in accordance with well-known practice. A preferred method of preparing the copolymers involves introducing suitable proportions of the comonomers with a solvent which may be a solvent for both the monomers and the copolymer and with a catalyst, such as one of the well-known organic peroxide catalysts, such as benzoyl peroxide, or one of the well-known azo catalysts, such as α,α'-azodiisobutyronitrile, into a reaction vessel in which the mixture is heated with continuous agitation for a period of 2 to 9 hours followed by cooling and recovery of the melt flow modifier.

The powder may contain one or more external plasticizers in an amount up to 50 percent by weight of the weight of the hard coating resin, but in amounts which do not cause the powder particles to stick together. Examples of plasticizers that are suitable include benzyl butyl phthalate, dibutyl phthalate, triphenyl phosphate, 2-ethyl hexyl benzyl phthalate and dicyclohexyl phthalate. Other well-known plasticizers which may be employed include diallyl phthalate, neopentyl glycol dibenzoate, dibenzyl phthalate, butyl cyclohexyl phthalate, mixed benzoic acid and fatty oil acid esters of pentaerythritol, poly(propylene adipate) dibenzoate, diethylene glycol dibenzoate, tetrabutylthiodisuccinate, butyl phthalyl butyl glycolate, acetyl tributyl citrate, dibenzyl sebacate, tricresyl phosphate, toluene ethyl sulfonamide, the di 2-ethylhexyl ester of hexamethylene diphthalate, and di(methylcyclohexyl) phthalate. Solid plasticizers are particularly useful. The particular plasticizer and the amount thereof used are chosen in accordance with the demand for compatibility.

While the powder coating can be applied directly to a degreased conductive surface, a primer is often useful, commonly increasing the peel strength of the coating resin. One such primer is an acid selected from the group consisting of butyl phosphoric acid, pyromellitic acid, trimesic acid, dimethyl ester of pyromellitic acid, phosphoric acid, and tetrachlorophthalic acid, applied in a solvent and the solvent then removed by evaporation with heat. Such acids may be mixed with the powder in some cases, as taught by U.S. Pat. No. 3,037,955, to E. V. Carman. Other suitable primers are well known, an example being one recommended by Eastman Chemical Products, Inc. as a base for cellulose acetate butyrate powder coatings as follows:

| Ingredient | Percent By Weight |
|---|---|
| Half-Second Cellulose Acetate Butyrate | 15 |
| Half-Second Cellulose Acetate Butyrate/TiO$_2$ Pigment Grind, 40:60 | 5 |
| Methylon 75121 (60% solids)* | 10 |
| Acryloid B-82 (40% solids)** | 15 |
| Dioctyl Phthalate | 5 |
| Toluene (Toluol) | 30 |
| Methyl Isobutyl Ketone (MIBK) | 10 |
| Isopropyl Alcohol | 5 |
| Methyl Isoamyl Ketone (MIAK) | 5 |

*General Electric Company, 111 Plastics Avenue, Pittsfield, Massachusetts 01203
**Rhom and Haas Company, Independence Mall West, Philadelphia, Pennsylvania 19105

Other well-known and commercially available primers are useful.

Various solvents may be employed in applying the primer, such as toluene, xylenes, acetone, methyl ethyl ketone, methyl isobutyl ketone, methyl isopropyl ketone, amyl alcohol, 2-ethoxyethyl acetate, ethyl acetate, butyl lactate, amyl acetate, methyl acetate, denatured ethyl alcohol, isopropanol, diacetone alcohol, cyclohexanol, ethylene dichloride, diisobutyl ketone, cyclohexanone, 2-butoxyethanol, furfural, petroleum naphtha boiling in the range of about 87° to about 145° C., cyclohexane, hexane, aromatic hydrocarbon mixtures, such as "Solvesso 150," and also various aliphatic, naphthenic and aromatic naphthas. Mixtures of such solvents are generally useful.

Among the resins which may be modified by the polymers of the invention are the alkyds including the drying or non-drying oil-modified alkyds, rosin-modified alkyds, mixed or co-reactive alkyds and epoxy resins, mixed or co-reactive alkyd/aminoplast/epoxy resins, mixed or co-reactive epoxidized esters of higher fatty acids with aminoplast resins, cellulose esters such as cellulose nitrate, cellulose acetate butyrate, cellulose acetate, and cellulose acetate propionate; nylons such as nylon 11 and nylon 12; epoxies such as the linear polymers derived from epichlorohydrin and bisphenol A and the epoxy acrylates; polysulfides, acetal polymers, polycarbonates, polysulfones, polyphenylene oxide, polyimides, polyxylylenes; silicones such as the polymer having repeating dimethylsilicone units; polyolefins such as polyethylene, polystyrene, and polypropylene; hard acrylics such as copolymers of 40 to 99.5 percent methyl methacrylate with another acrylic acid or methacrylic acid ester, and optionally, up to 50 percent of one of the functional monomers mentioned heretofore; chlorinated polyethers; polyhalo-olefins such as polytetrafluoroethylene, polyvinyl chloride, and polyvinylidene chloride; polyesters such as the unsaturated polyester derived from maleic anhydride, phthalic anhydride, and ethylene glycol; and so forth. The hard coating resins are well known for powder coatings; the present invention being to modify them with the melt viscosity reducing component (A) so that smooth uniform coatings can be obtained at a lower temperature than normal fusion temperature.

Representative coating resins will now be described.

Cellulose acetate butyrate is representative of the cellulose esters. It preferably has 16 to 40 percent of the hydroxyl groups in a glucose unit esterified with butyric acid and from 10 to 30 percent of such hydroxyl groups esterified by acetic acid. In the following specification, this is referred to as a cellulose acetate butyrate containing 16 to 40 percent butyryl and 10 to 30 percent acetyl. For some uses it is preferred that this ester contains 24 to 28 percent butyryl and 19 to 22 percent acetyl. The molecular weight of the cellulose ester should be such that when viscosity is determined on a 20 percent solution in a 90:10 acetone/ethanol mixture at 25° C. on a falling ball viscometer (ASTM D-1343-54T), the viscosity will be in the range from ½ to 5 seconds and preferably from ½ to 3 seconds, using a 5/16-inch steel ball falling through 10 inches in a 1-inch tube. This specification of molecular size of the cellulose acetate butyrate is commonly used in the industry and simply identifies the cellulose acetate butyrate as having a ½-second, a 5-second, or an intermediate viscosity. If the butyryl content is too high, it has been found that the compositions are too tacky for certain uses. On the other hand, when the butyryl content is too low, the coating has insufficient elasticity. In other uses, as in the cases where no flexing occurs, a cellulose acetate butyrate, having 12 to 14 percent acetyl and 35 to 39 percent butyryl, and a degree of substitution of about 2.7 is perfectly satisfactory.

The usual commercial cellulose nitrate, having a DS (degree of substitution) of about 1.9 to 2.3, a DP (degree of polymerization) of about 100 to 400, and about 10 to 12 percent nitrogen is useful in accordance with the invention.

Substantially any compatible hard acrylic coating resin having a Ti of from about 10° C. to about 100° C. or higher, preferably at least 65° C., is useful according to the invention. The "Ti" referred to is the transition temperature or inflection temperature which is found by plotting the modulus of rigidity against temperature by a method such as is described in British Plastics, 23, 87-90, 102 (September, 1950), determined at 300 kg./cm.$^2$. The "hard" acrylic monomers, those which when homopolymerized give a high Ti, include the lower alkyl ($C_1$-$C_4$) methacrylates, the higher alkyl ($C_{14}$-$C_{20}$) acrylates, acrylic acid, methacrylic acid, itaconic acid, tertamyl methacrylate, cyclohexyl acrylate or methacrylate, tertiary butyl acrylate, isobornyl methacrylate, benzyl acrylate and phenoxyethyl methacrylate. The "soft" acrylic or other monomers, or those which when homopolymerized give a low Ti, include the higher ($C_5$-$C_{15}$) methacrylates, the lower alkyl ($C_1$-$C_{13}$ alkyl) esters of acrylic acid, vinylidene chloride, ethyl thiaethyl methacrylate, and others, all as is more particularly described in U.S. Pat. Nos. 3,020,178; 2,972,592; and 3,795,564. As is known in the art, chain branching affects the Ti; the greater the branching the higher the Ti, in general. All or part of the hard acrylic monomer may be replaced by other ethylenically unsaturated hard monomers such as styrene, vinyltoluene, acrylonitrile, methacrylonitrile, vinyl acetate, or vinyl chloride. Blends of hard and soft monomers are useful in accordance with known procedures to give the desired Ti. As mentioned above, functional adhesion promoting monomers, including α,β-unsaturated carboxylic acids, such as acrylic acid, methacrylic acid, itaconic acid, aconitic acid, maleic acid, half esters of the dicarboxylic acids such as maleic acid, fumaric acid, the dimer or trimer of methacrylic acid, acrylamides such as acrylamide, methacrylamide, N-methylolacrylamide, N-methacrylamide, and N-ethylolacrylamide, are permissible in the coating resin.

These polymers and the other powder coating polymers are well known to the art.

While most of the coating resins described heretofore are thermoplastic, thermosetting resins such as the epoxies, the aminoplast-modified alkyds, and others are useful.

Representative crosslinkable coating resins will now be described.

The coating resin thus may be thermosetting, i.e., be subject to latent crosslinking. Such polymers are made with monomers which contain reactive groups capable of reacting with themselves or with other groups present in the polymer chain to impart crosslinking during heating or fusion of the coating. Where addition polymers are involved, monomers which are suitable for this function include certain acrylics having crosslinkable functionality exemplified by the following: acrylic acid; methacrylic acid; acrylamide; methacrylamide; epoxyalkyl acrylates or methacrylates, e.g., glycidyl methacrylate; monoacrylic acid esters of glycols; hydroxyalkyl acrylates or methacrylates, isocyanatoalkyl acrylates and aminoalkyl acrylates or methacrylates, as well as other compounds described below.

Examples of the latent crosslinking reactions which are possible using heat and/or catalysis are:

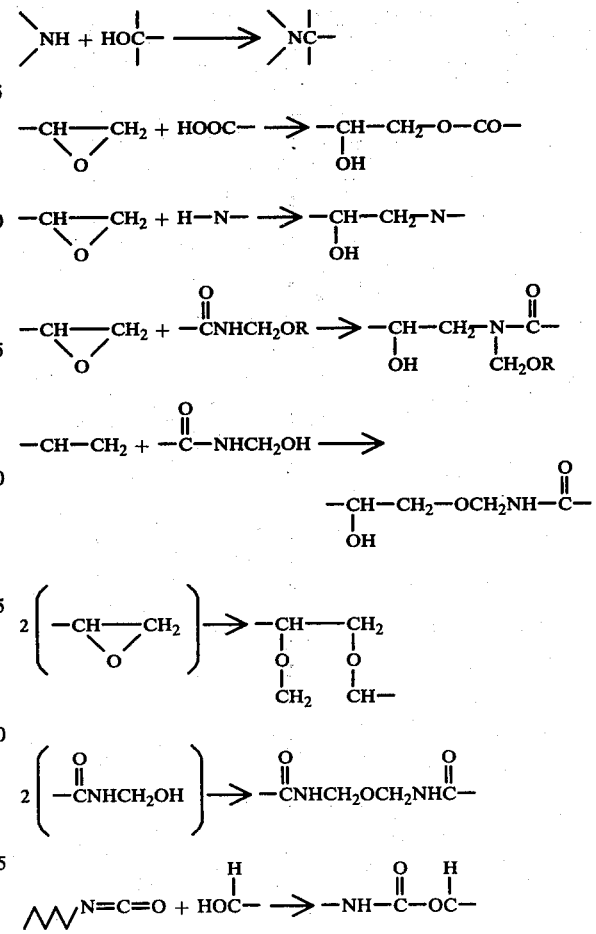

-continued

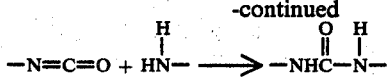

Addition polymerizable unsaturated monomers containing such groups are well known in the art, examples being isocyanates such as isocyanatoethyl methacrylate, epoxy compounds such as glycidyl methacrylate, aminoalkyl compounds such as methylaminoethyl methacrylate, and t-butylaminoethyl methacrylate, amides such as methacrylamide, guanamines such as 4-pentenoguanamine, hydroxyalkyl esters such as hydroxypropyl methacrylate and hydroxyethyl methacrylate, nitriles such as methacrylonitrile, N-alkoxyalkyl amides such as methoxymethyl methacrylamide, hydroxyalkyl amides such as N-methylol methacrylamide, the analogs of the above methacrylic acid derivatives with other unsaturated acids such as acrylic acid and itaconic acid, such acids themselves, dicarboxylic acids such as maleic acid and half esters and half amides thereof, vinyl ethers of glycols such as ethylene glycol, and so forth.

As may be seen, the latently crosslinkable addition polymerizable unsaturated monomers have reactive polar groups selected from those including —OH, >NH,

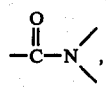

—N=C=O, >CHCN, —COOH, and

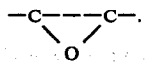

Such groups may be included as are mutually or self-crosslinkable, or added crosslinking compounds may be added, as is well known.

Generally, if used, such crosslinking monomers are present in amounts of from 0.05 to 5 percent, preferably from 0.1 to 3 percent by weight, based on the total monomers that form the coating resin.

Other thermosetting systems can be used, such as the aminoplast-modified alkyds described in U.S. Pat. No. 2,648,642 to F. R. Spencer, and the aminoplast-modified acrylics described in U.S. Pat. Nos. 2,978,433 to M. D. Hurwitz, 3,082,184 to D. R. Falgiatore and A. M. Levantin, 3,183,282 to M. D. Hurwitz, and 3,235,622 to D. H. Clemens and D. R. Falgiatore.

The coating resins are prepared by methods which have long been conventional in the art.

While, for certain purposes, a clear coating may be employed, it is quite general to include pigments in an amount up to 100 percent by weight of the polymer in the powder coating compositions. Examples of suitable pigments include titanium dioxide, carbon black, iron blues, phthalocyanine blues and greens; metal oxides, hydroxides, sulfides, sulfates, silicates and chromates; organic maroons, aluminum flake, bronze powders, pearl essence, and various fillers or extenders such as talc, barytes, china clay and diatomaceous earth. It will be obvious to those skilled in the organic coating art that the amount of pigment may be varied widely, depending on the effect desired. The amount of pigment, by weight based on the weight of the organic film-forming material, may vary between about 2 percent for light, high-hiding pigments, such as carbon black, and about 100 percent for heavy, low-hiding pigments such as lead chromate. The method of dispersing the pigment in the powdered resins is not critical provided a uniform dispersion is produced. The pigment may be present as separate particles or may be dispersed in either the coating resin particles or the melt flow reducing polymer particles of the invention, preferably the latter.

The powder particles are produced by various methods such as cryogenic grinding, ball milling, spray drying of latices, solutions, or non-aqueous dispersions, precipitation from solution, and so on. In fusing the coatings, temperatures of from about 180° C. to 500° C. are useful. With the thermosetting resins and the use of a catalyst, even lower temperatures are sometimes useful.

The hard coating resin, the melt flow modifying polymer, the pigment, and other materials used in the powder coating are desirably about 10 to about 500 microns, preferably 50 to 250 microns, in cross-section, and most desirably spherical in shape. The powder must be free-flowing and be resistant to sintering to form agglomerates at the temperatures used. The final composition can be prepared either by dryblending or melt-mixing, or solution mixing. As has been suggested heretofore, the hard powder coating resins per se form no part of the present invention, the invention being in modifying the same so that the combination has a low melt viscosity and is fused, with the formation of a uniform film, at a reasonably low temperature and a narrow temperature range. Useful temperatures depend upon the identity of the hard coating resin and the amount and identity of the melt flow reducing additive utilized, as well as the presence or absence of external plasticizers.

The following examples give the best modes presently contemplated for carrying out the invention.

Substantially any substrate which is capable of bearing an electrostatic charge different from the powder or which can be made to do so or which can be coated by fluidized bed procedures is useful. Thus, metals, conductive wood or paper, glass, glass made conductive by a tin oxide coating, and so forth, are suitable.

EXAMPLE 1

The following materials are mixed to form a solution:

| | | |
|---|---|---|
| Methyl methacrylate | 500 | g. |
| iso-Bornyl methacrylate | 420 | |
| n-Dodecyl mercaptan | 75.00 | |
| Acetyl peroxide (25% solution in dimethyl phthalate) | 1.50 | |
| Lupersol No. 7 peroxy catalyst | 2.50 | |
| t-Butyl hydroperoxide 70% | 0.75 | |
| Aerosol OT wetting agent | 0.16 | |
| Oxalic acid (2.8% in water) | 0.25 | |

The mix is degassed at 25 inches of vacuum and poured into a suitable container. The mass is heated in a forced air oven at 65° C. for eighteen hours and then heated at 80° for 2 hours and finally, heated for 6 hours at 120° C. to provide a colorless, transparent mass which is readily granulated or powdered to an average particle size of about 150 microns.

EXAMPLES 2 AND 3

The procedure of Example 1 is repeated with the following:

| | | |
|---|---|---|
| Methyl methacrylate | 450.0 | 450.0 |
| iso-Bornyl methacrylate | 450.0 | 450.0 |
| t-Butylaminoethyl methacrylate | 12.0 | 12.0 |
| Methacrylic acid | 8.0 | 8.0 |
| n-Dodecyl mercaptan | 75.0 | 75.0 |
| t-Butyl peroctoate | 1.0 | 1.0 |
| Azo-isobutyronitrile | 0.5 | 0.25 |
| Lupersol 7 (t-butyl peroxy acetate) | 2.5 | 2.5 |
| Dicumyl peroxide | 1.5 | 1.5 |
| Oxalic acid (2.8% in water) | 0.25 | 0.25 |
| Terpinolene | 0.05 | 0.0 |

EXAMPLE 4

Fifty pounds of Toluidine red, 100 pounds of the product of Example 2, and 120 pounds of mineral thinner are ground on a roller mill until the pigment is well dispersed.

This pigment dispersion is then dried and powdered and mixed with 400 pounds of polyvinyl chloride, also in powder form, and having an average particle size of about 200 microns.

The powder is placed in an electrostatic powder coating gun such as sold by the Interrad Corporation of Greenwich, Connecticut or by the Ransburg Electro-coating Corporation of Indianapolis, Indiana, which is set to provide a negative charge on the particles. A grounded steel plate is then exposed to a cloud of charged powder sprayed from the gun, and the so-coated substrate placed in an oven heated to about 400° F. until the coating is fused.

EXAMPLE 5

A high molecular weight hard solution polymer of methyl methacrylate and ethyl acrylate in a weight ratio of 95 to 5 is blended with the flow modifier product of Example 1 in various weight ratios, both being in powder form. The powder is then deposited on "Bonderized" steel panels and baked at the temperatures shown for 30 minutes. The proportions, the temperatures of baking, and the results are as follows:

| Ratio of Hard Acrylic Resin/Flow Modifier | Temperature and Results | | |
|---|---|---|---|
| | 250° F. | 300° F. | 350° F. |
| 100/0 | No flow, discrete powder particles | | |
| 97/3 | No flow, discrete powder particles | | |
| 95/5 | No flow | No flow | Flow |
| 90/10 | No flow | Flow | Flow |
| 85/15 | No flow | Flow | Flow |
| 80/20 | No flow | Flow | Flow |
| 0/100 | Flow | Flow | Flow |

In each case where "Flow" is specified, the result is that the powder flowed out to form a uniform and coherent film.

EXAMPLE 6

A hard polymer of methyl methacrylate and the methyl isobutylketamine of 2(2-aminoethoxy)ethyl methacrylate in a weight ratio of 94.5/0.5 prepared by a nonaqueous dispersion technique, hereinafter referred to as the hard polymer, is tested with and without inclusion of the product of Example 1. In each case, the identical amount and type of pigment and plasticizer are utilized except that in one case the melt viscosity modifier of Example 1 is included. The formulations are as follows:

| a) Absent Melt Viscosity Modifier | b) With Melt Viscosity Modifier |
|---|---|
| 38.0 g. - Pigment | 38.0 g. - Pigment |
| 34.2 g. - Plasticizer | 34.2 g. - Plasticizer |
| 32.8 g. - Solvent | 13.9 g. - Polymer of Example 1 |
| | 18.9 g. - Solvent |

In each case, the mixture is ground in a sand mill for 30 minutes. 131.4 g. of the ground product in each case is mixed with 197 g. of the hard polymer and 82 g. of solvent.

The pigment to binder ratio in these formulations is 25 parts by weight of pigment and 75 parts by weight of binder. The binder under a) is the hard polymer/plasticizer in the ratio of 70/30. In b) the binder is 62.3/11/26.7 hard polymer/melt flow modifier/plasticizer. When the pigment is included in the total solids, the melt flow modifier is present in an amount of about 8 percent by weight on a total solids basis. All parts are by weight.

The pigmented lacquers are cast on glass and baked at 180° F. for 1 hour and after being dried are scraped off the glass and reduced to powder form.

The powders are distributed on "Bonderized" steel panels and baked at various temperatures for 30 minutes to give the following results:

| Polymer | Baking Temperatures and Results | | |
|---|---|---|---|
| | 250° F. | 300° F. | 350° F. |
| Plasticizer hard polymer | No flow | No flow | No flow |
| Plasticizer hard polymer plus melt flow modifier | No flow | Flow | Flow |

In the cases where the blend flows, a coherent continuous film is formed.

These examples demonstrate that the melt flow modifier of the invention permit the use of hard coating resins for the powder coating methods known to the art, whereas the hard resins alone are not suitable for such use.

I claim:

1. A fluidizable powder coating composition, the particles of which are from about 10 to about 500 microns in diameter, a mixture of (A) about 3 to 10 parts by weight of a melt flow-modifying copolymer of about 40 percent to 60 percent by weight of a compound of the formula:

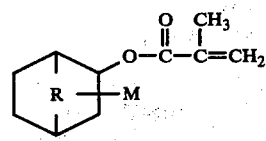

where R is selected from the group consisting of —CH$_2$—, —CH(CH$_3$)—, and —C(CH$_3$)$_2$—, and M is selected from the group consisting of a hydrogen atom and at least one methyl group, and 40 percent to 60 percent by weight of styrene, vinyl toluene, or at least one ester of acrylic acid or methacrylic acid and an aromatic, monocyclic aliphatic, or open chain aliphatic alcohol or alkoxy alcohol having from 1 to about 18 carbon atoms, or combinations thereof, said copolymer having an average molecular weight of from 1,000 to 8,500, and (B) 90 to 97 parts by weight of a thermoplastic coating resin selected from the group consisting of cellulose esters, polyvinylhalides, and acrylics.

2. The composition of claim 1 in which the coating resin particles are from 50 to 200 microns in size.

3. The composition of claim 1 in which the Tg of a homopolymer of said acrylic acid or methacrylic acid ester is at least 10° C.

4. The composition of claim 1 in which the melt flow-modifying polymer or the coating resin, or each, contains a finite amount, the total being up to about 5 percent by weight of total monomers, of one or more of a copolymerized ethylenically unsaturated polar monomer.

5. The composition of claim 3 in which said ester is an ester of methacrylic acid.

6. The composition of claim 1 in which said melt flow-modifying copolymer consists essentially of 45 percent to 55 percent of at least one of styrene, methyl acrylate, or an ester of methacrylic acid with an alkanol having from 1 to 4 carbon atoms and isobornyl methacrylate in an amount of about 45 percent to 55 percent, and in which the average molecular weight of the polymer is between about 2,000 and 3,000.

7. The composition of claim 6 in which the melt flow-modifying copolymer consists of isobornyl methacrylate and methyl methacrylate, and optionally, up to a total of 5 percent of one or more of an alkylaminoalkyl acrylate or methacrylate and acrylic acid, methacrylic acid, or itaconic acid.

8. A coating containing the fused copolymer of claim 1, on a substrate.

9. A coating containing the fused copolymer of claim 5, on a substrate.

10. The powder coating composition of claim 1 in which the coating resin is an acrylic resin having a Tg above 10° C.

11. The composition of claim 10 in which said acrylic resin contains at least about 95% by weight of polymerized methyl methacrylate.

12. A fluidizable powder coating composition the particles of which are from about 50 to about 200 microns in diameter in the form of a mixture of (A) a melt flow modifying amount of the copolymer of about 40% to 60% by weight of the compound of the formula

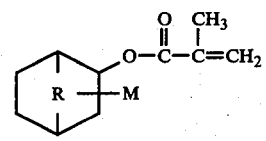

where R is selected from the group consisting of —CH$_2$—, —CH(CH$_3$)—, and —C(CH$_3$)$_2$—, and M is selected from the group consisting of a hydrogen atom and at least one methyl group, and 40 percent to 60 percent by weight of styrene, vinyl toluene, or at least one ester of acrylic acid or methacrylic acid and an aromatic, monocyclic aliphatic, or open chain aliphatic alcohol or alkoxy alcohol having from 1 to about 18 carbon atoms, or combinations thereof, said copolymer having an average molecular weight of from 1,000 to 8,500, and (B) an acrylic thermoplastic coating resin.

* * * * *